（12）United States Patent
Sugahara et al.

(10) Patent No.: US 12,388,636 B2
(45) Date of Patent: Aug. 12, 2025

(54) STORAGE APPARATUS, STORAGE METHOD, AND COMPUTER-READABLE STORAGE MEDIUM

(71) Applicant: JVCKENWOOD Corporation, Yokohama (JP)

(72) Inventors: Takayuki Sugahara, Yokohama (JP); Tetsuya Suwa, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 220 days.

(21) Appl. No.: 18/182,421

(22) Filed: Mar. 13, 2023

(65) Prior Publication Data

US 2023/0216672 A1 Jul. 6, 2023

Related U.S. Application Data

(63) Continuation of application No. PCT/JP2021/034825, filed on Sep. 22, 2021.

(30) Foreign Application Priority Data

Sep. 24, 2020 (JP) ................... 2020-159527
Sep. 24, 2020 (JP) ................... 2020-160129
Sep. 24, 2020 (JP) ................... 2020-160130

(51) Int. Cl.
*H04L 9/08* (2006.01)
*G02B 27/01* (2006.01)
*G06F 3/01* (2006.01)

(52) U.S. Cl.
CPC .......... *H04L 9/0872* (2013.01); *G02B 27/017* (2013.01); *G06F 3/011* (2013.01); *G02B 2027/0138* (2013.01); *G02B 2027/014* (2013.01)

(58) Field of Classification Search
CPC .............................. G06V 40/167; A01N 25/04
See application file for complete search history.

(56) References Cited

U.S. PATENT DOCUMENTS

| 6,807,365 | B1 | 10/2004 | Aoki |
| 2018/0235207 | A1* | 8/2018 | Curran ................ A01N 25/04 |
| 2020/0034608 | A1* | 1/2020 | Nduka ................ G06V 40/167 |

FOREIGN PATENT DOCUMENTS

| JP | 2000-341632 | 12/2000 |
| JP | 2003-184351 | 7/2003 |

OTHER PUBLICATIONS

International Search Report and Written Opinion for International Application No. PCT/JP2021/034825 mailed on Nov. 16, 2021, 8 pages.

* cited by examiner

*Primary Examiner* — Barbara B Anyan
(74) *Attorney, Agent, or Firm* — Amin, Turocy & Watson, LLP

(57) ABSTRACT

A storage apparatus includes a biological sensor configured to detect biological information on a user, an image acquisition unit configured to acquire, from an image capturing unit, an image that is captured around the user, an image processing unit configured to separate the image around the user into a line-of-sight direction image related to an image in a line-of-sight direction of the user and a peripheral image related to an image other than the line-of-sight direction image, an encryption unit configured to generate an encryption key for encrypting the line-of-sight direction image based on the biological information on the user, and encrypts the line-of-sight direction image by using the encryption key, and a storage control unit configured to store the line-of-sight direction image that is encrypted by the encryption unit in a storage unit.

6 Claims, 13 Drawing Sheets

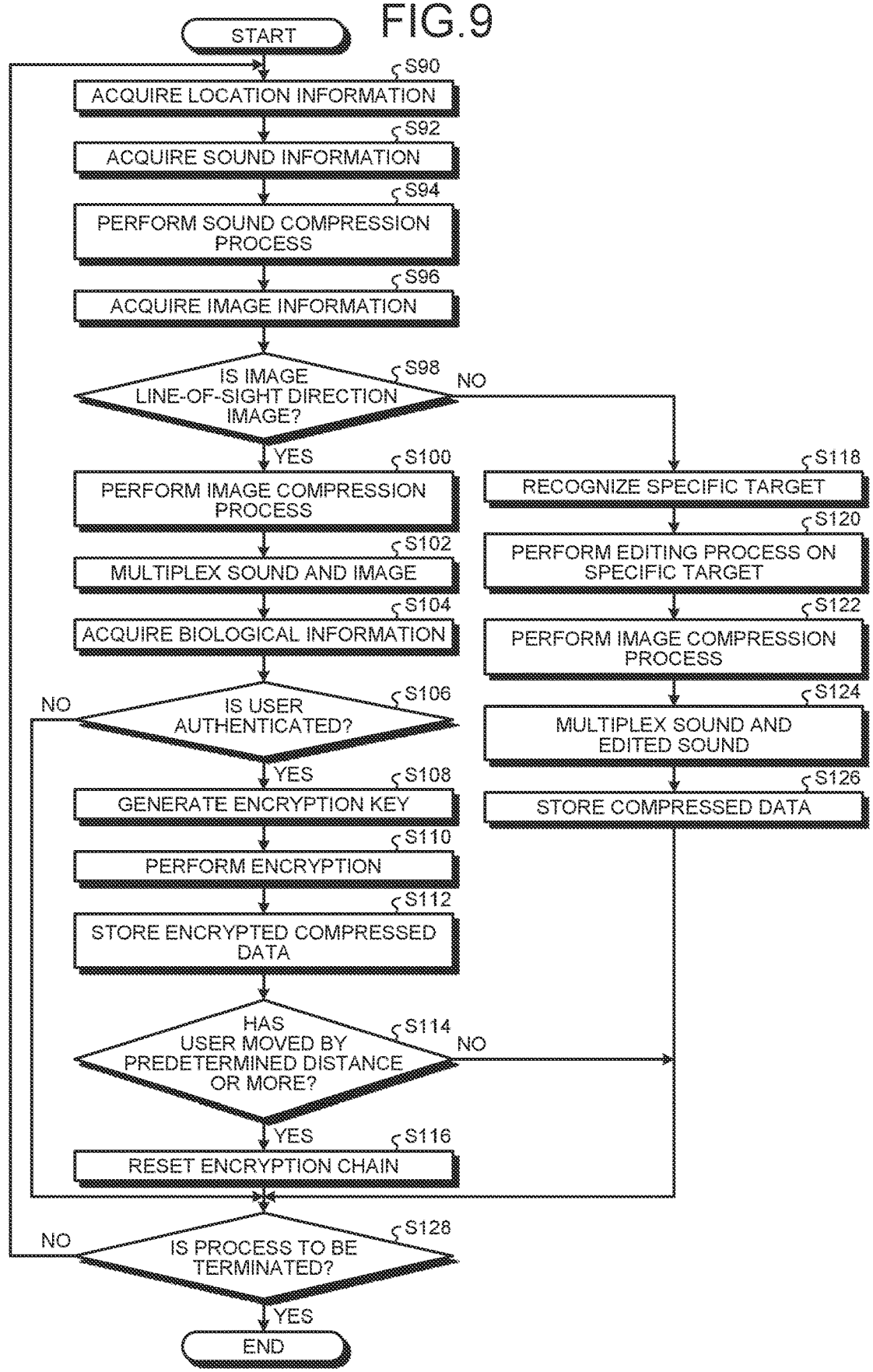

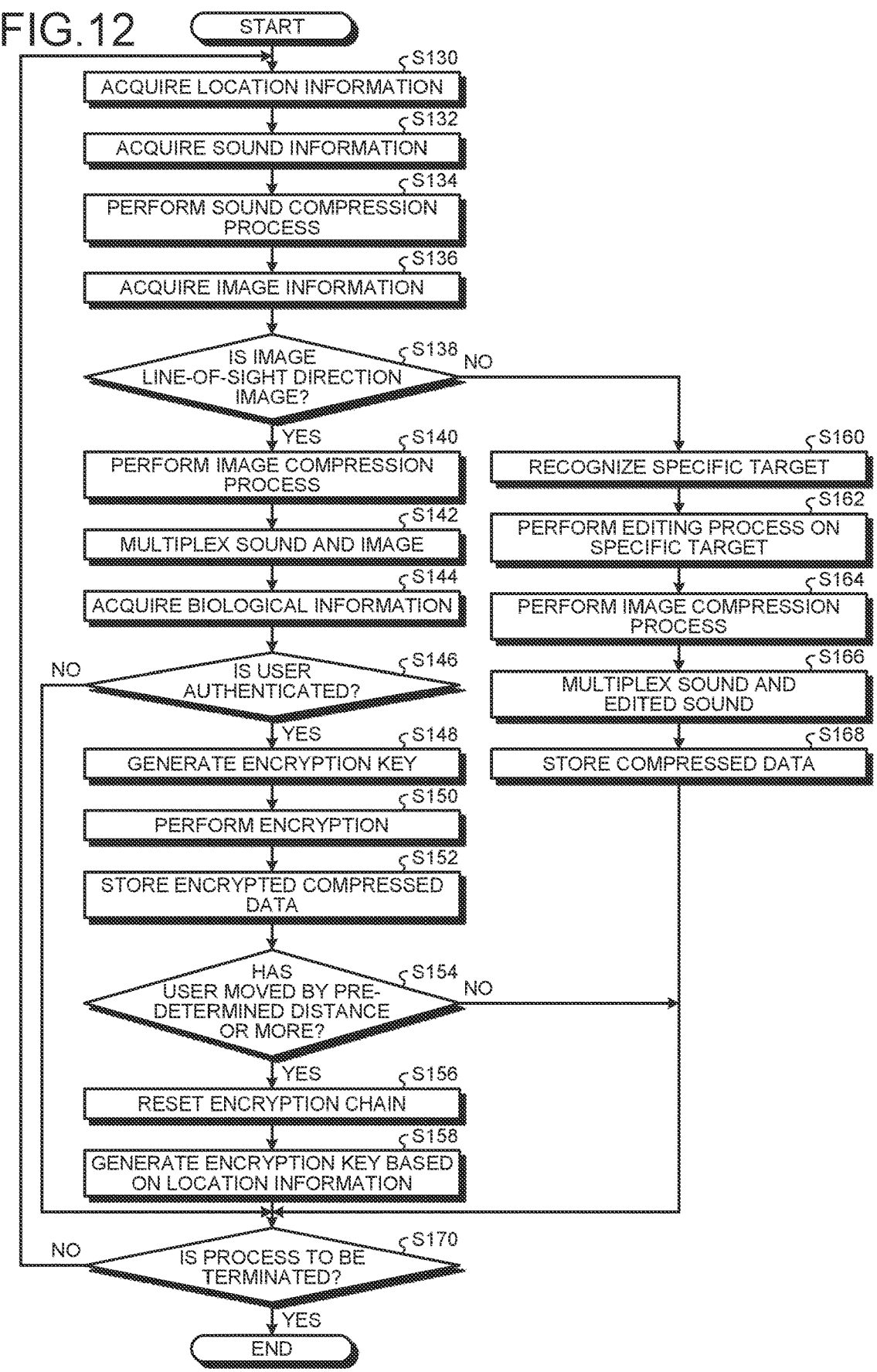

STORAGE APPARATUS, STORAGE METHOD, AND COMPUTER-READABLE STORAGE MEDIUM

CROSS-REFERENCE TO RELATED APPLICATION

This application is a Continuation of International Application No. PCT/JP2021/034825, filed Sep. 22, 2021, which designates the United States, incorporated herein by reference, and which claims the benefit of priority from Japanese Patent Applications No. 2020-159527, No. 2020-160129, and No. 2020-160130, each filed Sep. 24, 2020, all of which are incorporated herein by reference.

BACKGROUND

The present disclosure relates to a storage apparatus, a storage method, and a computer-readable storage medium.

As wearable devices that are worn by users, devices, such as a head mounted display (EMD) type and an eyeglass type, that are worn in a wide variety of manners have come out. The wearable devices as described above include a device that has a function to capture a moving image in a line-of-sight direction of a user by a camera, and record a captured video.

For example, Japanese Laid-open Patent Publication No. 2003-184351 describes a technology for matching a place that is viewed by a photographer and a place that is being captured in an image capturing device that is worn on an ear or a head. Japanese Laid-open Patent Publication No. 2000-341632 describes an apparatus that has a function to prevent snooping and falsification of image data that is digitally recorded.

Here, there is a need to appropriately store an image in a line-of-sight direction of a user among images that are captured by a wearable device that is worn by the user, in such a manner that the image is not easily accessible in order to protect privacy of the user and privacy of a target.

SUMMARY

A storage apparatus according to an aspect of the present disclosure includes: a biological sensor configured to detect biological information on a user; an image acquisition unit configured to acquire, from an image capturing unit, an image that is captured around the user; an image processing unit configured to separate the image around the user into a line-of-sight direction image related to an image in a line-of-sight direction of the user and a peripheral image related to an image other than the line-of-sight direction image; an encryption unit configured to generate an encryption key for encrypting the line-of-sight direction image based on the biological information on the user, and to encrypt the line-of-sight direction image by using the encryption key; and a storage control unit configured to store the line-of-sight direction image that is encrypted by the encryption unit in a storage unit.

A storage method according to an aspect of the present disclosure includes the steps of: detecting biological information on a user; acquiring, from an image capturing unit, an image that is captured around the user; separating the image around the user into a line-of-sight direction image related to an image in a line-of-sight direction of the user and a peripheral image related to an image other than the line-of-sight direction image; generating an encryption key for encrypting the line-of-sight direction image based on the biological information on the user; encrypting the line-of-sight direction image by using the encryption key; and storing the encrypted line-of-sight direction image in a storage unit.

A non-transitory computer-readable storage medium according to an aspect of the present disclosure stores a program causing a computer to execute: detecting biological information on a user; acquiring, from an image capturing unit, an image that is captured around the user; separating the image around the user into a line-of-sight direction image related to an image in a line-of-sight direction of the user and a peripheral image related to an image other than the line-of-sight direction image; generating an encryption key for encrypting the line-of-sight direction image based on the biological information on the user; encrypting the line-of-sight direction image by using the encryption key; and storing the encrypted line-of-sight direction image in a storage unit.

BRIEF DESCRIPTION OF THE DRAWINGS

FIG. 9 is a flowchart illustrating the flow of a process performed by the storage apparatus according to the third embodiment.

FIG. 12 is a flowchart illustrating an example of the flow of a process performed by the storage apparatus according to the fourth embodiment.

DETAILED DESCRIPTION

Embodiments according to the present disclosure will be described in detail below with reference to the accompanying drawings. The present disclosure is not limited by the embodiments below, and when a plurality of embodiments are provided, the present disclosure includes a combination of the embodiments. In addition, in the embodiments below, the same components are denoted by the same reference symbols, and repeated explanation will be omitted.

First Embodiment

Figure 1A:
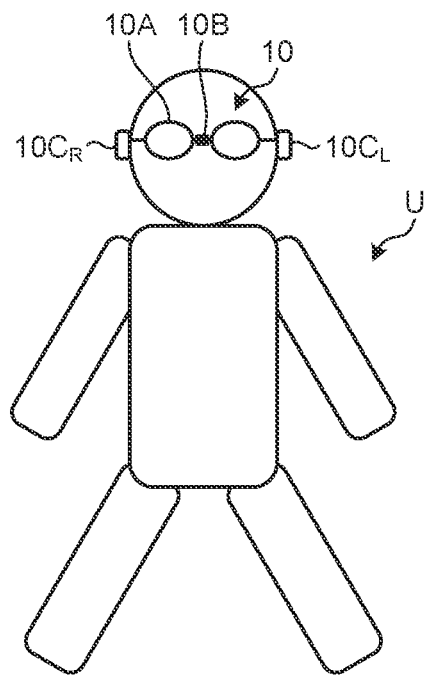
FIG. 1A is a schematic diagram illustrating a first example of a storage apparatus according to a first embodiment.
Figure 1B:
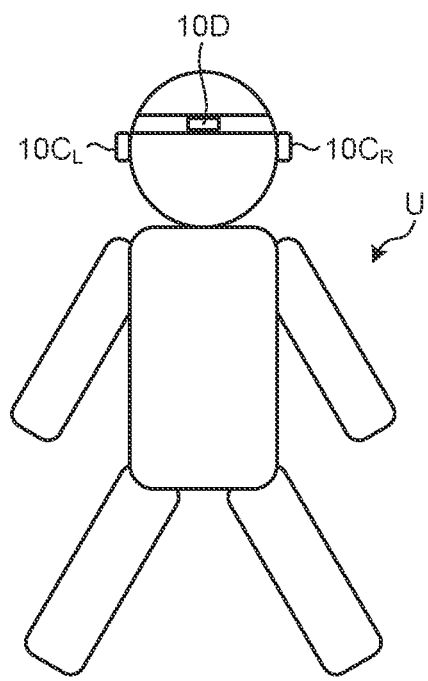
FIG. 1B is a schematic diagram illustrating the first example of the storage apparatus according to the first embodiment.

FIG. 1A and FIG. 1B are schematic diagrams illustrating a first example of a storage apparatus according to a first embodiment. FIG. 1A illustrates a front side of a user U, and FIG. 1B illustrates a back side of the user U. As illustrated in FIG. 1A and FIG. 1B, a storage apparatus 10 is a wearable device that is worn on a body of the user U. As illustrated in FIG. 1A and FIG. 1B, the storage apparatus 10 includes a device 10A that is worn on eyes of the user U, a device 10B that is arranged on the device 10A, a device $10C_L$ that is worn on a left ear of the user U, a device $10C_R$ that is worn on a right ear of the user U, and a device 10D that is worn on the back of a head of the user U. The device 10A is an eyeglass-type display unit that displays a video. The device 10B is a camera that captures a video in a line-of-sight direction of the user U. The device $10C_L$ is a microphone that collects sound from a left direction of the user U. The device $10C_R$ is a microphone that collects sound from a right direction of the user U. The device $10C_L$ and the device $10C_R$ may be binaural microphones. The device 10D is a camera that captures a video behind the user U.

Figure 2:
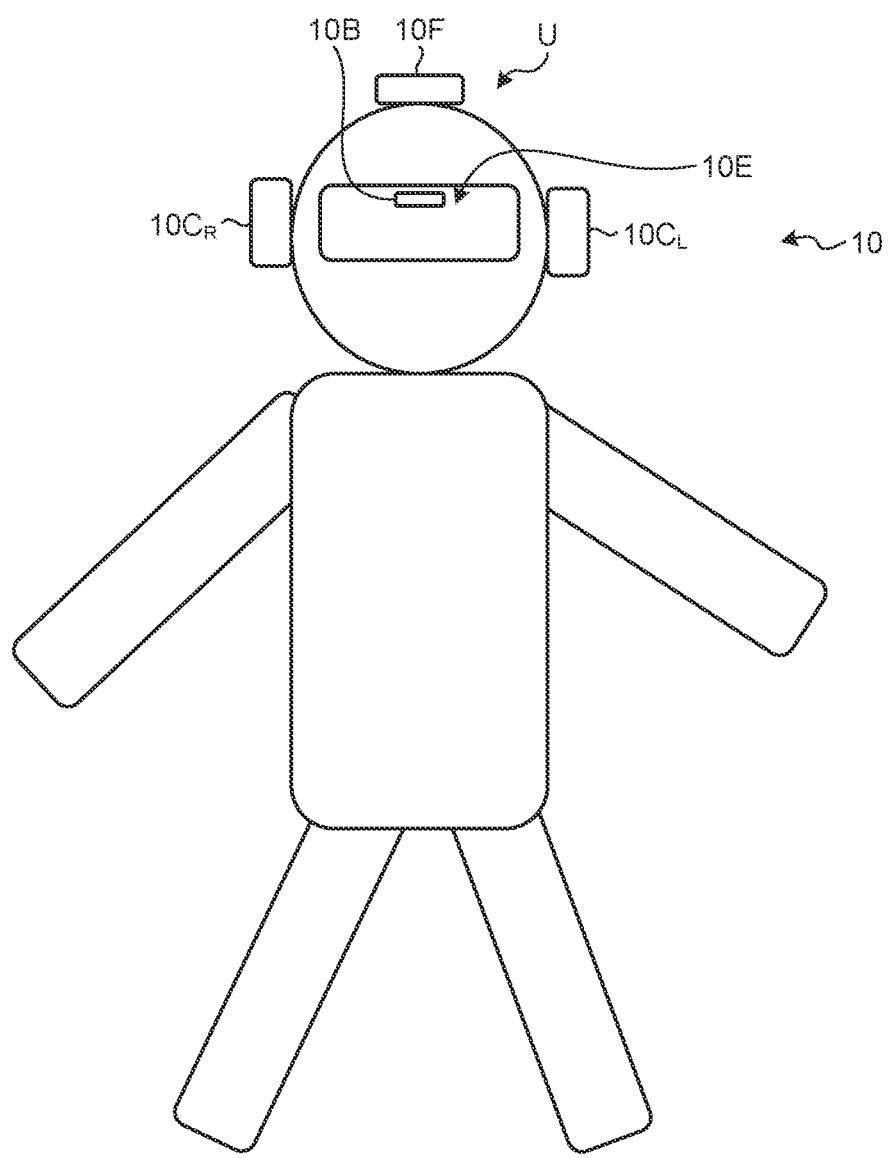
FIG. 2 is a schematic diagram illustrating a second example of the storage apparatus according to the first embodiment.

FIG. 2 is a schematic diagram illustrating a second example of the storage apparatus according to the first embodiment. FIG. 2 illustrates the front side of the user U. As illustrated in FIG. 2, the storage apparatus 10 includes a device 10E that is worn on the eyes of the user U, the device 10B that is arranged on the device 10D, the device $10C_L$ that is worn on the left ear of the user U, the device $10C_R$ that is worn on the right ear of the user U, and a device 10F that is worn on a top of the head of the user U. The device 10D is a goggle-type display unit that displays a video, and is what is called an HMD. The device 10F is a camera with a fisheye lens that captures a 360-degree image around the user U. The device 10F may be what is called an omnidirectional camera.

Storage Apparatus

Figure 3:
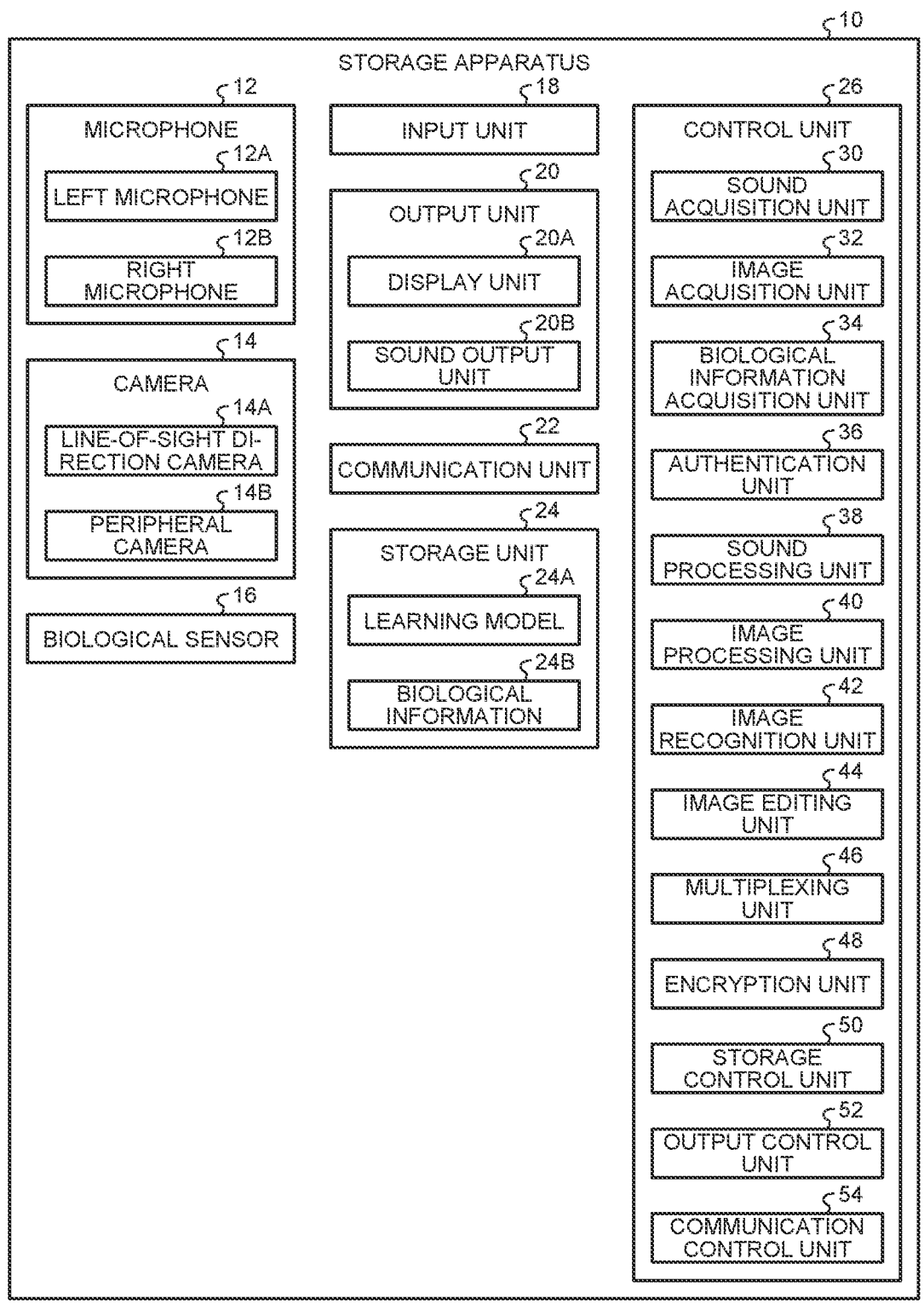
FIG. 3 is a block diagram illustrating a configuration example of the storage apparatus according to the first embodiment.

A configuration example of the storage apparatus according to the first embodiment will be described with reference to FIG. 3. FIG. 3 is a block diagram illustrating a configuration example of the storage apparatus according to the first embodiment.

As illustrated in FIG. 3, the storage apparatus 10 includes a microphone 12, a camera 14, a biological sensor 16, an input unit 18, an output unit 20, a communication unit 22, a storage unit 24, and a control unit 26.

The microphone 12 is a microphone that detects sound (sound wave information) around the storage apparatus 10 (the user U). The microphone 12 includes, for example, a left microphone 12A and a right microphone 12B.

The left microphone 12A is worn on, for example, the left ear of the user U. The left microphone 12A detects sound in a left direction of the storage apparatus 10 (the user U). The right microphone 12B is worn on, for example, the right ear of the user U. The right microphone 12B detects sound in a right direction of the storage apparatus 10 (the user U). The left microphone 12A and the right microphone 12B may be, for example, binaural microphones. Meanwhile, the microphones included in the microphone 12 are not limited to the left microphone 12A and the right microphone 12B. The positions and the number of the microphones 12 that are arranged in the storage apparatus 10 may be arbitrary. For example, with use of the microphone 12 and a directional microphone with directivity, it is possible to store sound on the front, back, left, and right around the storage apparatus 10 (the user U) in a multiplexed manner.

The camera 14 is an image capturing device, and captures an image around the storage apparatus 10 by detecting visible light around the storage apparatus 10 (the user U). The camera 14 may be a video camera that captures an image at a predetermined frame rate. The camera 14 includes a line-of-sight direction camera 14A and a peripheral camera 14B.

The line-of-sight direction camera 14A captures an image in the line-of-sight direction of the user U. The line-of-sight direction camera 14A is arranged in a display unit 20A of the output unit 20 so as to be able to capture an image in the line-of-sight direction of the user U, for example. The line-of-sight direction camera 14A may be arranged in a portion other than the display unit 20A of the output unit 20.

The peripheral camera 14B captures an image in a range other than the line-of-sight direction of the user U around the storage apparatus 10 (the user U). The peripheral camera 14B is arranged on the back of the head of the user U and captures an image on the back side of the user U, for example.

The positions and the number of the line-of-sight direction camera 14A and the peripheral camera 14B arranged in the storage apparatus 10 may be arbitrary. The line-of-sight direction camera 14A may be configured in an integrated manner with the peripheral camera 14B. In this case, the camera 14 may be an omnidirectional camera that is worn on the top of the head of the user U. The omnidirectional camera captures an image of a range of 360 degrees around the storage apparatus 10 (the user U). The camera 14 may include a plurality of cameras and the plurality of cameras may capture images in the range of 360 degrees around the storage apparatus 10 (the user U). The camera 14 may include, for example, a gimbal mechanism, and may capture an image in the range of 360 degrees around the storage apparatus 10 (the user U) while being rotated by the gimbal mechanism.

The biological sensor 16 is a sensor that detects biological information on the user U. The biological sensor 16 may be arranged at an arbitrary position as long as it is possible to detect the biological information on the user U. The biological information acquired by the biological sensor 16 may be universal information that is unique to the user U. In the present embodiment, the biological information may be, for example, a fingerprint, an iris pattern, a vein shape of a finger and a hand, and the like, but is not limited thereto. The biological information may be a combination of information on a fingerprint or the like and information on a feature of a face. The biological information may be genetic information on the user U. The biological sensor 16 is implemented by, for example, a fingerprint sensor, a vein sensor, a camera, or the like.

The input unit 18 receives various kinds of operation on the storage apparatus 10. The input unit 18 is implemented by, for example, a button, a touch panel, and the like.

The output unit 20 outputs various kinds of information. The output unit 20 includes, for example, the display unit 20A and a sound output unit 20B. The display unit 20A displays various kinds of videos. In the present embodiment, the display unit 20A is, for example, an eyeglasses-type display or an HMD. The sound output unit 20B outputs various kinds of sound. The sound output unit 20B is a speaker.

The communication unit 22 performs communication with a different external apparatus. The communication unit 22 is implemented by, for example, a communication module, such as Wi-Fi (registered trademark) or Bluetooth (registered trademark). The communication unit 22 may have a function to perform communication with a different external apparatus in a wired manner, for example.

The storage unit 24 is a memory for storing various kinds of information, such as details of calculation performed by the control unit 26 and programs, and includes at least one of a main storage device, such as a random access memory (RA) or a read only memory (ROM), and an external storage apparatus, such as a hard disk drive (HDD), for example.

The storage unit 24 stores therein a learning model 24A and biological information 24B. The learning model 24A is an AI model that is used for recognizing a specific target that is included in an image, on the basis of the image. The learning model 24A may be, for example, a learning model using a convolutional neural network (CNN). The learning model 24A is used for recognizing, for example, privacy information related to privacy, such as a face of a person, a license plate of a vehicle, or a house nameplate. The learning model 24A may be learned so as to be able to recognize a copyrighted material that is protected by copyright, for example. The biological information 24B is biological information that includes, for example, a fingerprint, an iris pattern, or a vein shape of a finger and a hand of the user U. In other words, the biological information 24B is biological information on a person who is permitted to use the storage apparatus 10.

The control unit 26 controls operation of each of the units of the storage apparatus 10. The control unit 26 is implemented by, for example, causing a central processing unit (CPU), a micro processing unit (MPU), or the like to execute a program stored in a storage unit (not illustrated) by using a RAM or the like as a work area. The control unit 26 may be implemented by an integrated circuit, such as an application specific integrated circuit (ASIC) or a field programmable gate arrays (FPGA), for example. The control unit 26 may be implemented by a combination of a hardware and software.

The control unit 26 includes a sound acquisition unit 30, an image acquisition unit 32, a biological information acquisition unit 34, an authentication unit 36, a sound processing unit 38, an image processing unit 40, an image recognition unit 42, an image editing unit 44, a multiplexing unit 46, an encryption unit 48, a storage control unit 50, an output control unit 52, and a communication control unit 54.

The sound acquisition unit 30 causes the microphone 12 to detect sound around the storage apparatus 10 (the user U). The sound acquisition unit 30 acquires the sound that is detected by the microphone 12. Details of a process performed by the sound acquisition unit 30 will be described later.

The image acquisition unit 32 causes the camera 14 to capture an image around the storage apparatus 10 (the user U). The image acquisition unit 32 acquires the image that is captured by the camera 14. Details of a process performed by the image acquisition unit 32 will be described later.

The biological information acquisition unit 34 causes the biological sensor 16 to detect biological information on the storage apparatus 10 (the user U). The biological information acquisition unit 34 acquires the biological information that is detected by the biological sensor 16. Details of a process performed by the biological information acquisition unit 34 will be described later.

The authentication unit 36 authenticates the user U. The authentication unit 36 performs authentication on whether to allow the user U to use the storage apparatus 10, on the basis of the biological information that is acquired by the biological information acquisition unit 34. Details of a process performed by the authentication unit 36 will be described later.

The sound processing unit 38 performs various kinds of sound signal processing on the sound that the sound acquisition unit 30 has acquired from the microphone 12. Details of a process performed by the sound processing unit 38 will be described later.

The image processing unit 40 performs various kinds of image processing on the image that the image acquisition unit 32 has acquired from the camera 14. Details of a process performed by the image processing unit 40 will be described later.

The image recognition unit 42 recognizes a specific target from the image that is acquired by the image acquisition unit 32. Details of a process performed by the image recognition unit 42 will be described later.

The image editing unit 44 performs various kinds of editing processes on the image that is acquired by the image acquisition unit 32. The image editing unit 44 performs an editing process on the specific target that is recognized by the image recognition unit 42. A process performed by the image editing unit 44 will be described later.

The multiplexing unit 46 multiplexes the sound that is acquired by the sound acquisition unit 30 and the sound that is acquired by the image acquisition unit 32. A multiplexing method may be arbitrary. Details of a process performed by the multiplexing unit 46 will be described later.

The encryption unit 48 encrypts data that is multiplexed by the multiplexing unit 46. The encryption unit 48 encrypts the data that is multiplexed by the multiplexing unit 46, by using a predetermined encryption method and an encryption key. Details of a process performed by the encryption unit 48 will be described later.

The storage control unit 50 stores various kinds of information in the storage unit 24. Details of a process performed by the storage control unit 50 will be described later.

The output control unit 52 causes the output unit 20 to output various kinds of information. The output control unit 52 causes the display unit 20A to display various kinds of videos. The output control unit 52 causes the sound output unit 20B to output various kinds of sound.

The communication control unit 54 controls the communication unit 22. The communication control unit 54 causes the communication unit 22 to transmit and receive various kinds of information to and from an external apparatus.

Process Performed by Storage Apparatus

Figure 4:
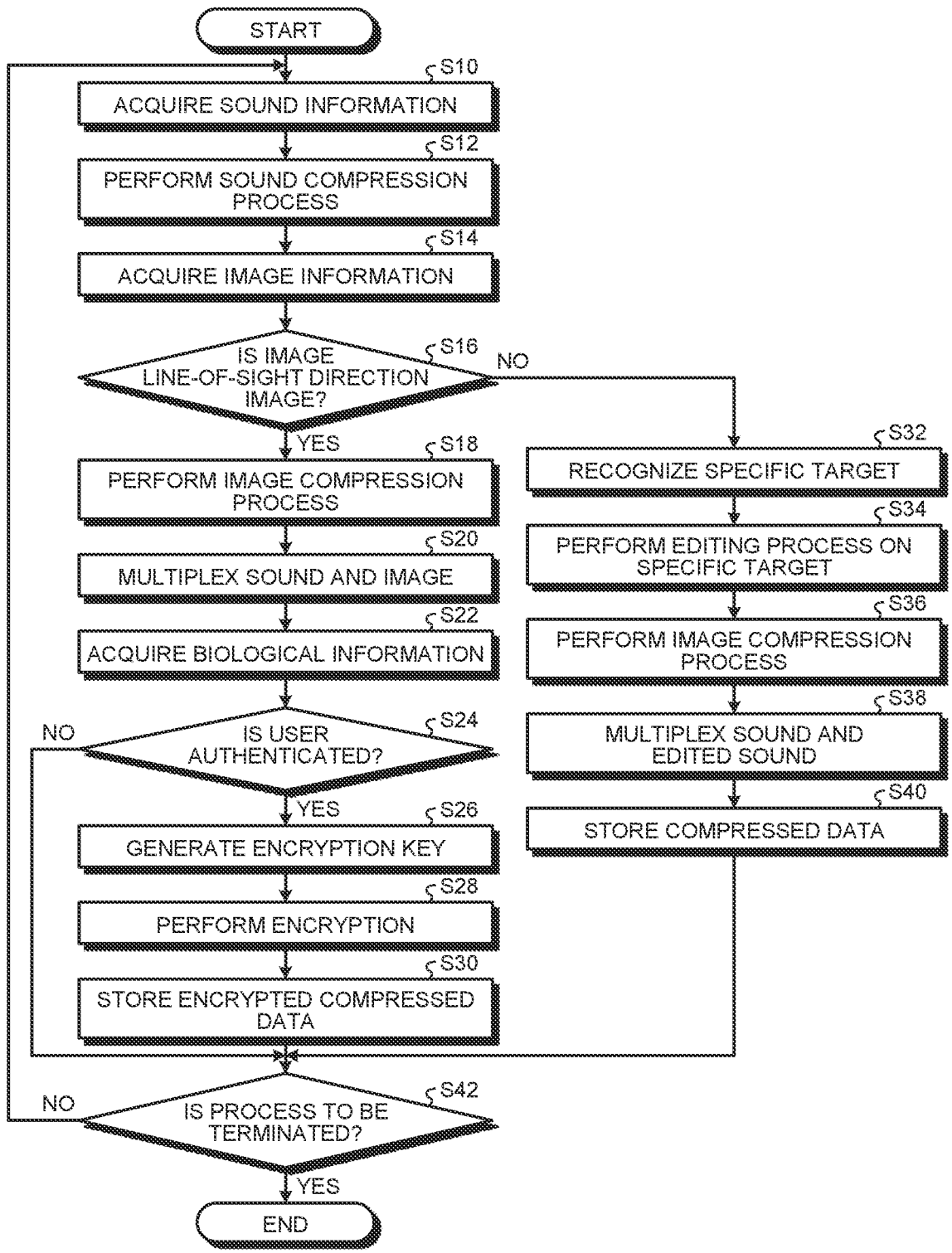
FIG. 4 is a flowchart illustrating an example of the flow of a process performed by the storage apparatus according to the first embodiment.

A process performed by the storage apparatus according to the first embodiment will be described with reference to FIG. 4. FIG. 4 is a flowchart illustrating an example of the flow of a process performed by the storage apparatus according to the first embodiment.

The control unit 26 acquires sound information on sound around the storage apparatus 10 (the user U) (Step S10). Specifically, the sound acquisition unit 30 acquires sound in the left direction of the storage apparatus 10 (the user U), which is detected by the left microphone 12A. The sound acquisition unit 30 acquires sound in the right direction of the storage apparatus 10 (the user U), which is detected by the right microphone 12B. Then, the process goes to Step S12.

The control unit 26 performs a sound compression process on the sound information that is acquired by the sound acquisition unit 30 (Step S12). Specifically, the sound processing unit 38 performs sound compression signal processing on the sound that the sound acquisition unit 30 has acquired from the left microphone 12A and the sound that the sound acquisition unit 30 has acquired from the right microphone 12B, and generates a stereo signal in an MP3 format or the like, for example. Then, the process goes to Step S14.

The control unit 26 acquires image information on an image around the storage apparatus 10 (the user U) (Step S14). Specifically, the image acquisition unit 32 acquires a line-of-sight direction image related the image in the line-of-sight direction of the user U, which is captured by the line-of-sight direction camera 14A. The image acquisition unit 32 acquires a peripheral image related to the image in a peripheral area other than the line-of-sight direction of the user U, which is captured by the peripheral camera 14B. Then, the process goes to Step S16.

The control unit 26 determines whether a processing target image is the line-of-sight direction image (Step S16). Specifically, to separately perform image processing on the line-of-sight image direction and the peripheral direction image, the image processing unit 40 separates the image that is acquired by the image acquisition unit 32 into the line-of-sight image direction and the peripheral direction image. If it is determined that the image is the line-of-sight direction image (Step S16; Yes), the process goes to Step S18. If it is determined that the image is the peripheral image (Step S16; No), the process goes to Step S32. In other words, in the present embodiment, if it is determined as Yes at Step S16, the image processing is performed on the line-of-sight image direction, and, if it is determined as No at Step S16, the image processing is performed on the peripheral image.

If it is determined as Yes at Step S16, the control unit 26 performs an image compression process on the line-of-sight direction image (Step S18). Specifically, the image processing unit 40 compresses the line-of-sight direction image by codec of an arbitrary system, such as Moving Picture Experts Group (MPEG)-4 or H.264, and converts the image into an arbitrary file format, such as an MP4 format. Then, the process goes to Step S20.

The control unit 26 multiplexes the sound and the image (Step S20). Specifically, the multiplexing unit 46 multiplexes the image that has been subjected to the compression process at Step S18 and the corresponding sound that has been subjected to the compression process at Step S12, and generates a single piece of compressed data. More specifically, the multiplexing unit 46 packs each piece of the compressed data of the image and the sound in a predetermined size. The multiplexing unit 46 performs a multiplexing process by the MPEG multiplexing method in which a timestamp of the same time is assigned to packs that need to be reproduced at the same time, on the basis of a synchronous timer signal of a counter (not illustrated) at 90 kHz, 27 MHz, or the like, for example. Then, the process goes to Step S22.

The control unit 26 acquires the biological information on the user U (Step S22). Specifically, the biological information acquisition unit 34 acquires the biological information, such as a fingerprint, on the user U from the biological sensor 16. Then, the process goes to Step S24.

The control unit 26 determines whether the user U is authenticated (Step S24). Specifically, the authentication unit 36 compares the biological information on the user U that is acquired at Step S22 and the biological information 24B that is stored in the storage unit 24, and if the pieces of the biological information match with each other, the authentication unit 36 determines that the user U is authenticated. If it is determined that the user U is authenticated (Step S24; Yes), the process goes to Step S26. If it is determined that the user U is not authenticated (Step S24; No), the process goes to Step S42.

If it is determined as Yes at Step S24, the control unit 26 generates an encryption key (Step S26). Specifically, the encryption unit 48 generates an encryption key that is unique to the user U on the basis of the biological information on the user U such that personal authentication is available without management. In other words, in the present embodiment, the encryption key is generated from the biological information that is not realized even by the subject person, so that information on the key itself is not stolen by a third party. Then, the process goes to Step S28.

The control unit 26 encrypts the compressed data (Step S28). Specifically, the encryption unit 48 encrypts the compressed data that has been multiplexed at Step S20, by several-fold and a unit, for example. For the encryption, an encryption method called Data Encryption Standard (DES) or Advanced Encryption Standard (AES) is used. DES and AES are algorithms for data encryption using a common key cryptographic method. DES is a block cipher that divides data into blocks of 64 bits and collectively encrypts each block. DES has a key length of 56 bits and is handled as 64 bits by adding 8 bits for parity check. AES is the same as DES in that the common key cryptographic method is adopted. A key length of AES is selectable from 128 bits, 192 bits, and 252 bits, each of which is longer than the key length of DES. Therefore, AES is safer than DES. In the present embodiment, the encryption unit 48 encrypts the compressed data by using AES with 256 bits. Then, the process goes to Step S30.

The control unit 26 stores the encrypted compressed data (Step S30). Specifically, the storage control unit 50 stores the compressed data that has been encrypted at Step S28 in the storage unit 24. Then, the process goes to Step S42.

If it is determined as No at Step S16, the control unit 26 recognizes a specific target that is included in the peripheral image (Step S32). Specifically, the image recognition unit 42 recognizes privacy information on privacy, such as a face of a person, a license plate of a vehicle, or a house nameplate, that is included in the peripheral image by using the learning model 24A. The image recognition unit 42 may recognize different privacy information. At Step S32, the image recognition unit 42 may recognize copyright information on a copyrighted material that is included in the peripheral image by using the learning model 24A, for example. Then, the process goes to Step S34.

The control unit 26 performs an editing process on the recognized specific target (Step S34). Specifically, the image editing unit 44 performs editing such that the privacy information that has been recognized from the peripheral image is not recognizable. For example, the image editing unit 44 performs image processing for reducing identify of a region that includes the privacy information such that the privacy information is not identifiable. The image processing for reducing the identity is, for example, mosaic processing. The mosaic processing is processing for replacing a predetermined image region with data of an average value. The image editing unit 44 may perform various kinds of filtering processes including a Gaussian filter or a median filter on the region including the privacy information, for example. The image editing unit 44 may perform certain conversion, such as a tone change process or a brightness change process, which includes a change of a target resolution or a specific hue, on the region including the privacy information, for example. The image editing unit 44 may perform a blurring process, a point clouding process, or a process of deleting a certain part, for example. Then, the process goes to Step S36.

The control unit 26 performs an image compression process on the peripheral image that has been subjected to the editing process (Step S36). Specifically, the image processing unit 40 compresses the edited peripheral image by codec of an arbitrary system, such as MPEG-4 or H.264, and converts the image into an arbitrary file format, such as an MP4 format. Then, the process goes to Step S38.

The control unit 26 multiplexes the sound and the image (Step S38). Specifically, the multiplexing unit 46 multiplexes the image that has been subjected to the compression process at Step S36 and the corresponding sound that has been subjected to the compression process at Step S12, and generates a single piece of compressed data. More specifically, the multiplexing unit 46 packs each piece of the compressed data of the image and the sound in a predetermined size. The multiplexing unit 46 performs a multiplexing process by the MPEG multiplexing method in which a timestamp of the same time is assigned to packs that need to be reproduced at the same time, on the basis of a synchronous timer signal of a counter (not illustrated) at 90 kHz, 27 MHz, or the like, for example. Then, the process goes to Step S40.

The control unit 26 stores the encrypted compressed data (Step S40). Specifically, the storage control unit 50 stores the compressed data that has been compressed at Step S38 in the storage unit 24. Then, the process goes to Step S42.

The control unit 26 determines whether the process is to be terminated (Step S42). Specifically, the control unit 26 determines that the process is to be terminated if operation indicating termination of the process is received or operation of turning off a power supply is received. If it is determined that the process is to be terminated (Step S42; Yes), the process in FIG. 4 is terminated. If it is determined that the process is not to be terminated (Step S42; No), the process goes to Step S10.

As described above, in the first embodiment, the image in the line-of-sight direction of the user U is stored in the storage unit 24 inside the storage apparatus 10 by using an encryption key that is generated based on the biological information on the user U. With this configuration, in the first embodiment, the privacy information including the fact that the user U has paid attention and a target in the line-of-sight direction of the user U are stored in an encrypted manner, so that it is possible to appropriately store the image while protecting privacies of both of the user and the target.

Furthermore, in the first embodiment, as for the peripheral image of the user U, the privacy information included in the peripheral image is recognized, the privacy information is subjected to image processing, and the image is stored in the storage unit 24 inside the storage apparatus 10 such that the privacy information included in the peripheral image is indistinguishable. With this configuration, in the first embodiment, it is possible to store the peripheral image of the user U as a behavior history of the user U, and appropriately store the image while protecting the privacy information included in the peripheral image.

Moreover, in the first embodiment, only the image in the line-of-sight direction of the user U is encrypted, so that it is possible to prevent an increase in a buffer memory in a storage process and prevent delay of the storage process. With this configuration, in the first embodiment, it is possible to reproduce the stored line-of-sight direction image and the stored peripheral image at a high speed while protecting the privacy information.

Second Embodiment

A second embodiment will be described below. A configuration of the storage apparatus according to the second embodiment is the same as the configuration of the storage apparatus 10 illustrated in FIG. 3, and therefore, explanation thereof will be omitted.

The storage apparatus 10 according to the second embodiment is different from the first embodiment in that the image in the line-of-sight direction of the user U and the peripheral image are temporally synchronized with each other. Further, the second embodiment is different from the first embodiment in that the peripheral image is stored in an external apparatus that is different from the storage apparatus 10.

Process Performed by Storage Apparatus

Figure 5:
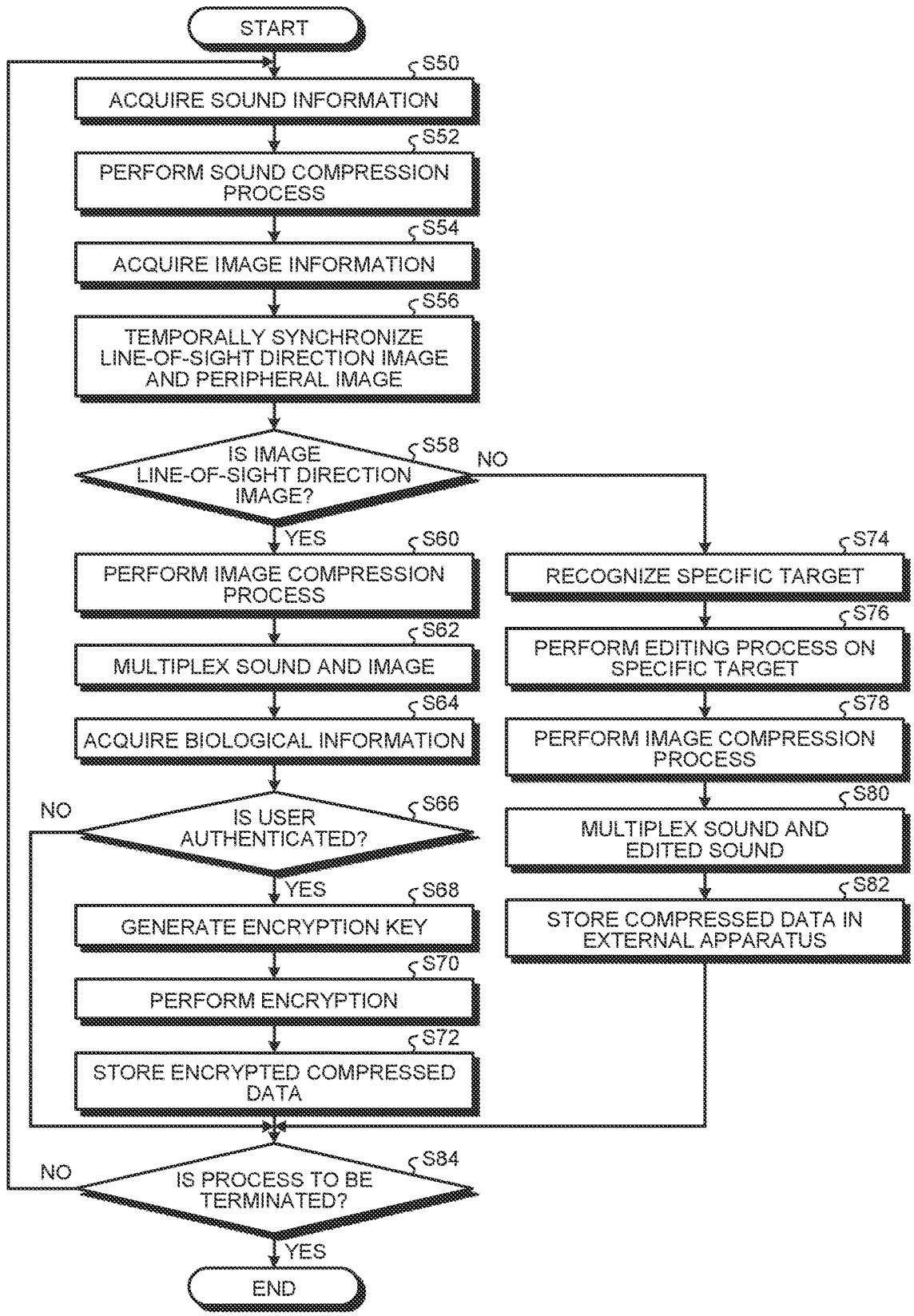
FIG. 5 is a flowchart illustrating an example of the flow of a process performed by a storage apparatus according to a second embodiment.

A process performed by the storage apparatus according to the second embodiment will be described below with reference to FIG. 5. FIG. 5 is a flowchart illustrating an example of the flow of a process performed by the storage apparatus according to the second embodiment.

Processes from Step S50 to Step S54 are the same as the processes from Step S10 to Step S14 illustrated in FIG. 4, and therefore, explanation thereof will be omitted.

The control unit 26 temporally synchronizes the line-of-sight direction image and the peripheral image (Step S56). Specifically, the image acquisition unit 32 adds timestamps to the line-of-sight direction image and the peripheral image such that the line-of-sight direction image and the peripheral image that are captured at the same time can be distinguished from each other. Then, the process goes to Step S58.

Processes from Step S58 to Step S80 are the same as the processes from Step S16 to Step S38 illustrated in FIG. 4, and therefore, explanation thereof will be omitted.

The control unit 26 stores the encrypted compressed data in an external apparatus (Step S82). Specifically, the storage control unit 50 stores the compressed data that has been compressed at Step S80 in the external apparatus that is different from the storage apparatus 10 via the communication unit 22. Then, the process goes to Step S84.

A process at Step S84 is the same as the process at Step S42 illustrated in FIG. 4, and therefore, explanation thereof will be omitted.

As described above, in the second embodiment, timestamps are added to the line-of-sight direction image and the peripheral direction image, and each of the images is stored. With this configuration, in the second embodiment, a correspondence relationship between the line-of-sight direction image and the peripheral direction image is clarified, so that it is possible to more appropriately store the images.

Furthermore, in the second embodiment, the peripheral image is stored in an external apparatus that is different from the storage apparatus 10. With this configuration, in the second embodiment, security of the peripheral image is further increased, so that it is possible to more appropriately store the image.

Third Embodiment

A third embodiment will be described below. In the third embodiment, in a storage apparatus that captures images and stores the images in chronological order while the user U is moving to different places, a process of resetting an encryption chain for block cipher is performed every time the user moves a predetermined distance.

Figure 6:
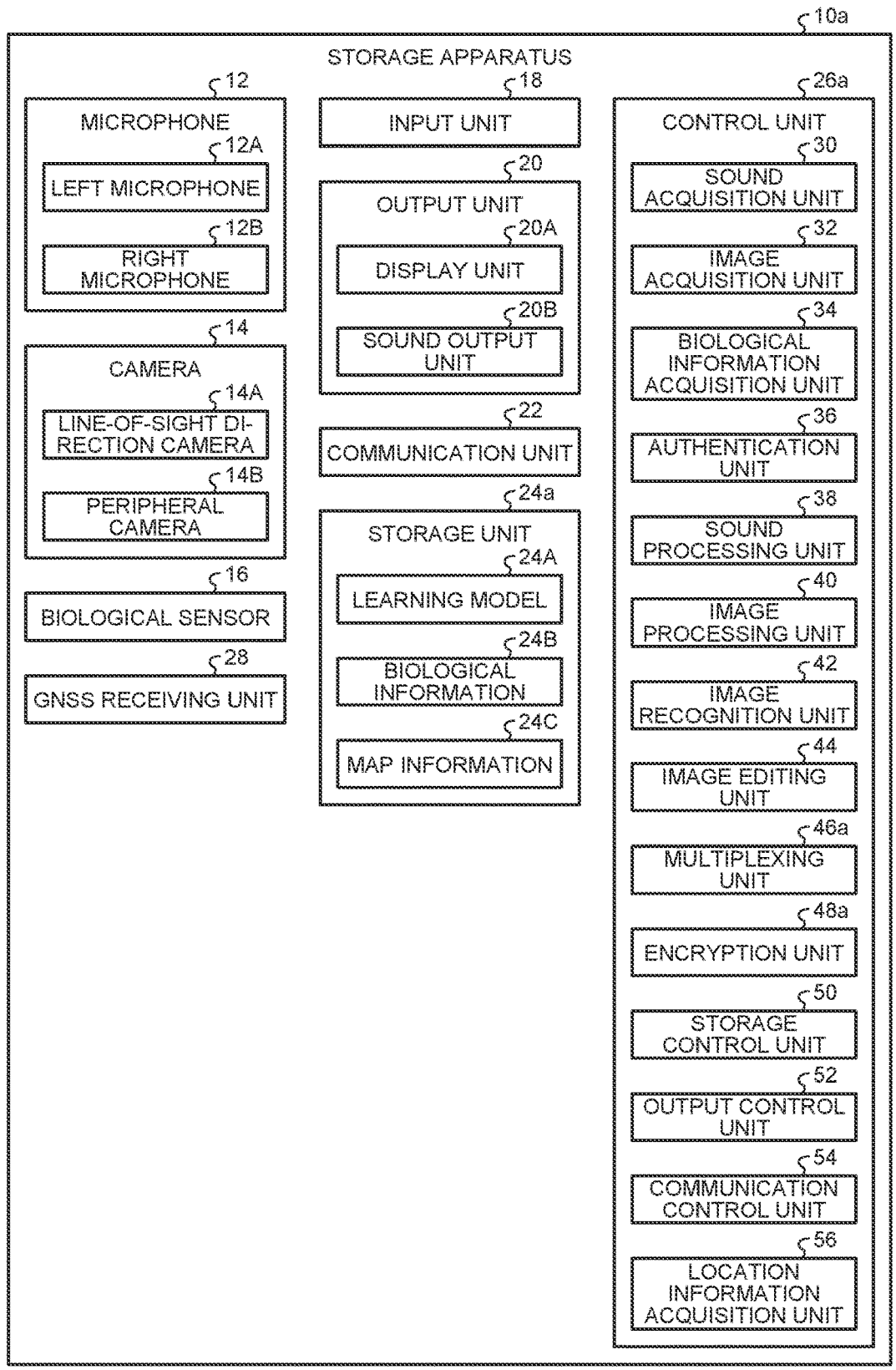
FIG. 6 is a block diagram illustrating a configuration example of a storage apparatus according to a third embodiment.

A configuration of a storage apparatus according to the third embodiment will be described with reference to FIG. 6. FIG. 6 is a block diagram illustrating a configuration example of the storage apparatus according to the third embodiment.

As illustrated in FIG. 6, a storage apparatus 10a is different from the storage apparatus 10 illustrated in FIG. 3 in that a storage unit 24a stores therein map information 24C. The storage apparatus 10a is different from the storage apparatus 10 illustrated in FIG. 3 in that a global navigation satellite system (GNSS) receiving unit 28 is provided. The storage apparatus 10a is different from the storage apparatus 10 illustrated in FIG. 3 in that a control unit 26a includes a location information acquisition unit 56. Meanwhile, it is assumed that the storage unit 24a stores therein the map information 24C, but embodiments are not limited to this example. It is sufficient for the storage unit 24a to acquire map information 24c via the communication unit 22 and store therein the map information 24C. In other words, the storage unit 24a need not always store therein the map information 24C in advance, but it is sufficient to store the map information 24C on an as-needed basis.

The GNSS receiving unit 28 is a device that detects location information on the storage apparatus 10a (the user U). The location information in this example is earth coordinates. In the present embodiment, the GNSS receiving unit 28 is what is called a GNSS module that receive radio waves from satellites and detects the location information on the storage apparatus 10a.

The map information 24C is data including location information on an existing building or a natural object, and is data including earth coordinates and the location information on the existing building or the natural object.

The location information acquisition unit 56 acquires the location information from the GNSS receiving unit 28. The location information acquisition unit 56 determines whether the storage apparatus 10a (the user U) is located in a predetermined area on the basis of the location information that is acquired by the GNSS receiving unit 28 and map information 30B. In the present embodiment, it is preferable that precision of the location information is within about 100 meters (m).

In the second embodiment, an encryption unit 48a encrypts an image that is captured around the user, by block cipher. The block cipher is a method of dividing an image into predetermined blocks and then performing encryption. The block cipher includes two systems as rules for handling block data other than the encryption process. One of the systems is an electric codebook (ECB) mode, and the other one of the systems is an output feedback (OFB) mode. In the present embodiment, the OFB mode is used.

Figure 7A:
FIG. 7A is a diagram for explaining encryption in an ECB mode.
Figure 7B:
FIG. 7B is a diagram for explaining decryption in the ECB mode.

Before explanation of the OFB mode, the ECB mode will be described with reference to FIG. 7A and FIG. 7B. FIG. 7A is a diagram for explaining encryption in the ECB mode. FIG. 7B is a diagram for explaining decryption in the ECB mode.

As illustrated in FIG. 7A, in the ECB mode, plaintext block data 100 is encrypted by using a predetermined encryption key, and ciphertext block data 102 is obtained. To decrypt the ciphertext block data 102, as illustrated in FIG. 7B, the ciphertext block data 102 is encrypted by using the same encryption key as the encryption key that is used for encrypting the plaintext block data 100, and the plaintext block data 100 is obtained. In the ECB mode, it is possible to obtain the same result if the plaintext block data 100 is the same data. In the ECB mode, the same encryption is adopted for all pieces of block data; therefore, the method is simple, easy, easily implementable, and speedy, so that it is possible to randomly access any block data in encrypted data and start decryption. However, the ECB mode is disadvantageous in that a pattern may be analyzed by a third party by comparison between the plaintext block data 100 and the ciphertext block data 102, the ciphertext may be fraudulently decrypted, and data may be falsified by replacing data in units of block data.

Figure 8A:
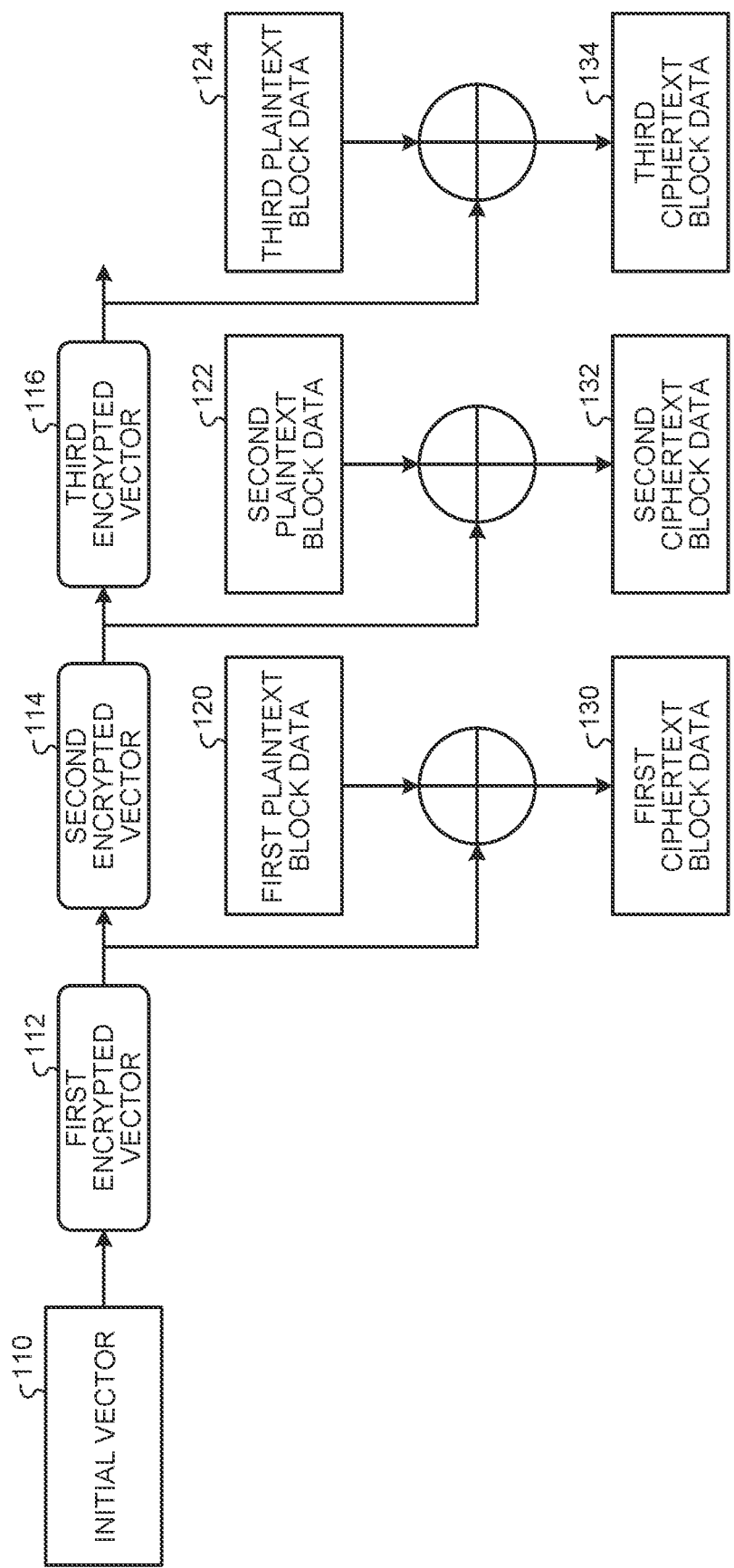
FIG. 8A is a diagram for explaining encryption in an OFB mode.
Figure 8B:
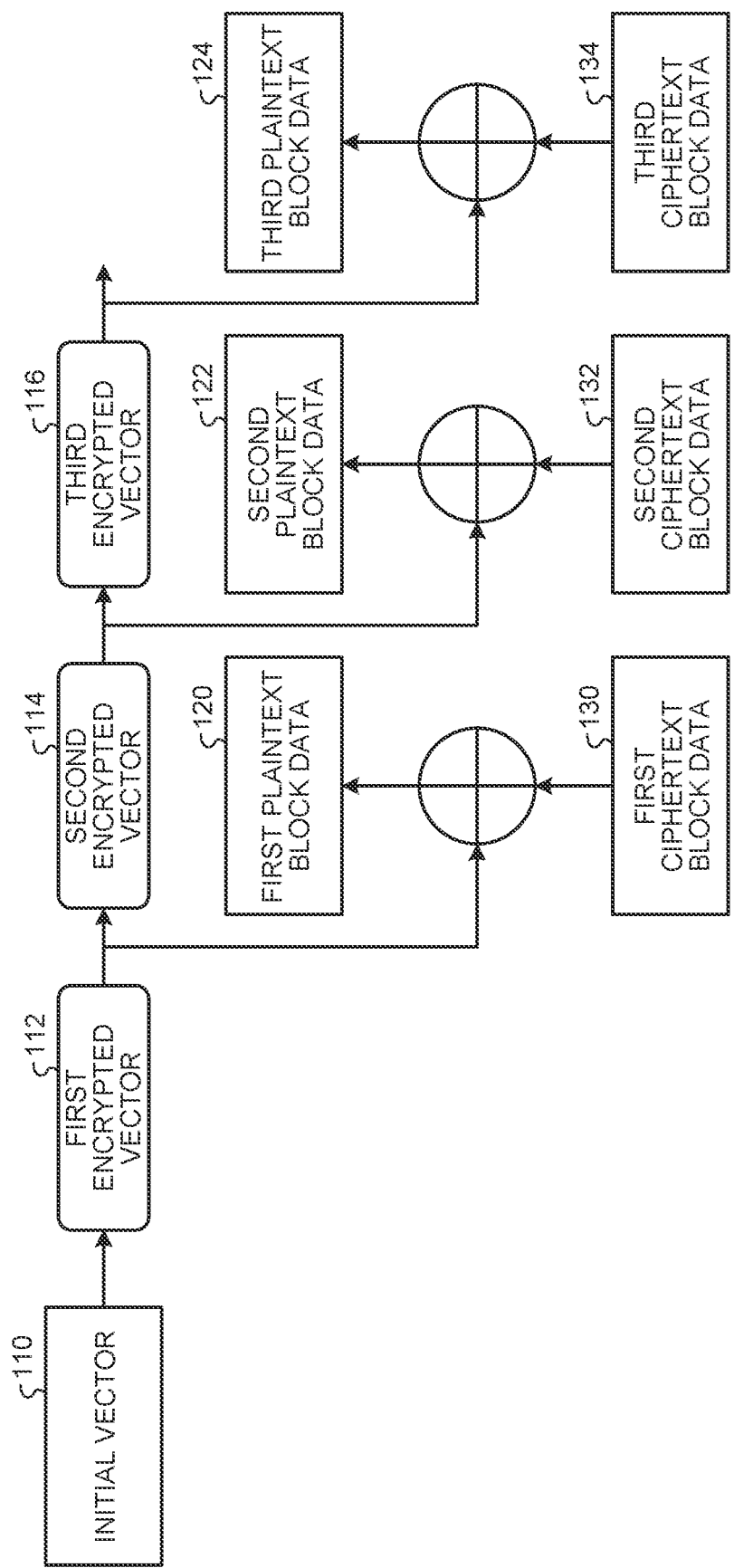
FIG. 8B is a diagram for explaining decryption in the OFB mode.

The OFB mode will be described with reference to FIG. 8A and FIG. 8B. FIG. 8A is a diagram for explaining encryption in the OFB mode. FIG. 8B is a diagram for explaining decryption in the OFB mode.

With reference to FIG. 8A, a method of encrypting three pieces of plaintext block data, that is, first plaintext block data 120, second plaintext block data 122, and third plaintext block data 124, will be described. As illustrated in FIG. 8A, in the OFB mode, an initial vector 110 is encrypted by a predetermined encryption key, and a first encrypted vector 112 is generated. By calculating exclusive-OR between the first plaintext block data 120 and the first encrypted vector 112, first ciphertext block data 130 is obtained. In the OFB mode, to encrypt the second plaintext block data 122, the first encrypted vector 112 is further encrypted by a predetermined encryption key, and a second encrypted vector 114 is generated. By calculating exclusive-OR between the second plaintext block data 122 and the second encrypted vector 114, second ciphertext block data 132 is obtained. In the OFB mode, to encrypt the third plaintext block data 124, the second encrypted vector 114 is further encrypted by a predetermined encryption key, and a third encrypted vector 116 is generated. By calculating exclusive-OR between the third plaintext block data 124 and the third encrypted vector 116, third ciphertext block data 134 is obtained. The initial vector 110, the first encrypted vector 112, the second encrypted vector 114, and the third encrypted vector 116 are called as a key stream. The initial vector 110, the first encrypted vector 112, the second encrypted vector 114, and the third encrypted vector 116 are also called as an encryption chain.

A method of decrypting the three pieces of ciphertext block data, that is, the first ciphertext block data 130, the second ciphertext block data 132, and the third ciphertext block data 134, will be described with reference to FIG. 8B. As illustrated in FIG. 8B, in the OFB mode, the initial vector 110 is encrypted by a predetermined encryption key, and the first encrypted vector 112 is generated. By calculating exclusive-OR between the first ciphertext block data 130 and the first encrypted vector 112, the first plaintext block data 120 is obtained. In the OFB mode, to decrypt the second ciphertext block data 132, the first encrypted vector 112 is further encrypted by a predetermined encryption key, and the second encrypted vector 114 is generated. By calculating exclusive-OR between the second ciphertext block data 132 and the second encrypted vector 114, the second plaintext block data 122 is obtained. In the OFB mode, to encrypt the third ciphertext block data 134, the second encrypted vector 114 is further encrypted by a predetermined encryption key, and the third encrypted vector 116 is generated. By calculating exclusive-OR between the third ciphertext block data 134 and the third encrypted vector 116, the third plaintext block data 124 is obtained. The initial vector 110, the first encrypted vector 112, the second encrypted vector 114, and the third encrypted vector 116 are called as a key stream. The initial vector 110, the first encrypted vector 112, the second encrypted vector 114, and the third encrypted vector 116 are also called as an encryption chain.

Process Performed by Storage Apparatus

A process performed by the storage apparatus according to the third embodiment will be described with reference to FIG. 9. FIG. 9 is a flowchart illustrating the flow of the process performed by the storage apparatus according to the third embodiment.

The control unit 26a acquires current location information on the storage apparatus 10a (the user U) (Step S90). Specifically, the location information acquisition unit 56 acquires the current location information on the storage apparatus 10a (the user U) on the basis of the location information that is acquired by the GNSS receiving unit 28 and the map information 30B. Then, the process goes to Step S92.

Processes from Step S92 to Step S100 are the same as the processes from Step S10 to Step S18 illustrated in FIG. 4, and therefore, explanation thereof will be omitted.

The control unit 26a multiplexes the sound and the image (Step S102). Specifically, a multiplexing unit 46a multiplexes the image that has been subjected to the compression process at Step S18 and the corresponding sound that has been subjected to the compression process at Step S12. Further, the location information acquired at Step S90 is added, and a single piece of compressed data is generated. More specifically, the multiplexing unit 46a packs the compressed data of the image and the sound, which are associated with the location information, in a predetermined size. The multiplexing unit 46a performs a multiplexing process by the MPEG multiplexing method in which a timestamp of the same time is assigned to packs that need to be reproduced at the same time, on the basis of a synchronous timer signal of a counter (not illustrated) at 90 kHz, 27 MHz, or the like, for example. Then, the process goes to Step S104.

Processes at Step S104 and Step S106 are the same as the processes at Step S22 and Step S24 illustrated in FIG. 4, and therefore, explanation thereof will be omitted.

If it is determined as Yes at Step S106, the control unit 26a generates an encryption key (Step S108). Specifically, the encryption unit 48a generates a key stream of encryption keys of respective encryption blocks that are included in an encryption chain, on the basis of the initial vector that is prepared in advance. Then, the process goes to Step S110.

The control unit 26a encrypts the compressed data (Step S110). Specifically, the encryption unit 48a calculates exclusive-OR between the compressed data and the key stream by using the key stream that is generated at Step S106, and encrypts the compressed data by an encryption chain in which a plurality of pieces of encryption block data are continued. Then, the process goes to Step S112.

A process at Step S112 is the same as the process at Step S30 illustrated in FIG. 3, and therefore, explanation thereof will be omitted.

The control unit 26a determines whether the user has moved a predetermined distance or more (Step S114). Specifically, the location information acquisition unit 56 determines whether the storage apparatus 10a (the user U) has moved the predetermined distance or more on the basis of the location information that is acquired by the GNSS receiving unit 28 and the map information 24C.

Figure 10:
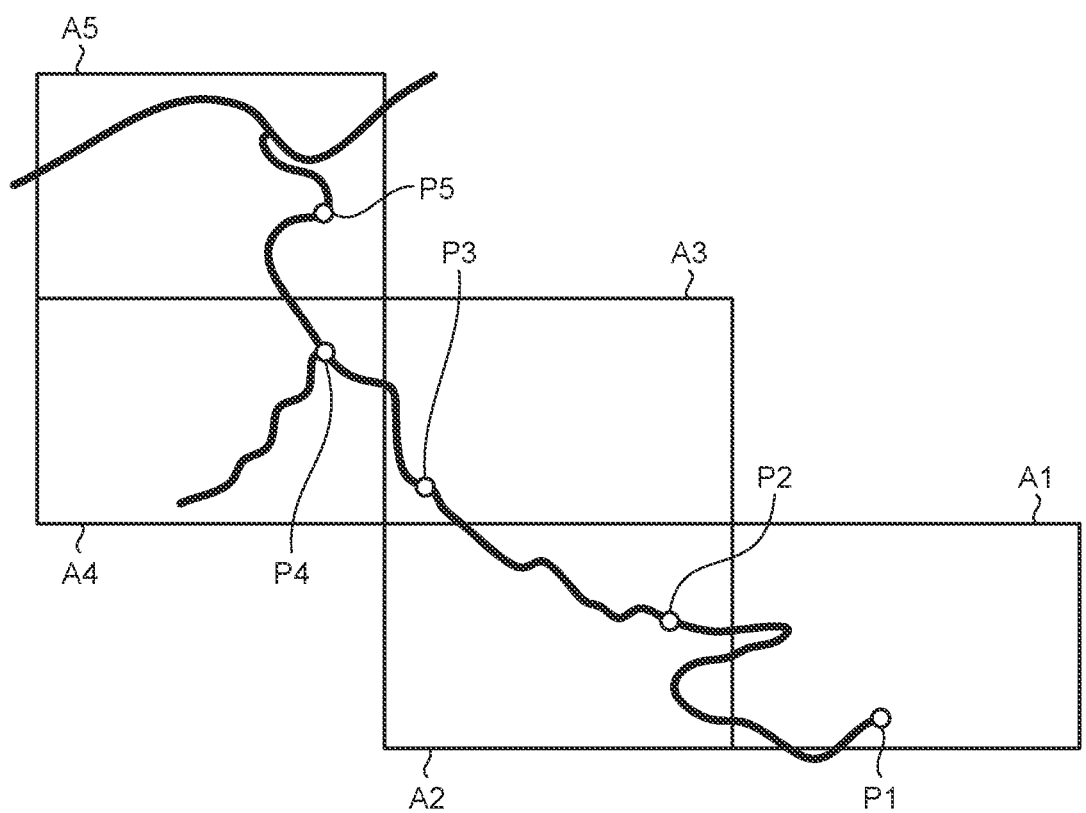
FIG. 10 is a diagram for explaining a method of determining whether the storage apparatus has moved a predetermined distance or more.

FIG. 10 is a diagram for determining whether the storage apparatus 10a (the user U) has moved the predetermined distance or more. FIG. 10 illustrates a trajectory of the storage apparatus 10a (the user U) on a map. It is assumed that the storage apparatus 10a moves from a point P1 to a point P5. The storage apparatus 10a captures images in the line-of-sight direction of the user U, encrypts the captured images, and stores the encrypted images while the user U is visiting tourist spots between the point P1 and the point P5.

The location information acquisition unit 56 acquires the location information on the storage apparatus 10a (the user U) while the storage apparatus 10a (the user U) is moving from the point P1 to the point P5. In this case, for example, the map information 24C includes area information on an area A1, an area A2, an area A3, an area A4, and an area A5. In other words, the map information 24C is associated with the area A1 to the area A5 in advance. The location information acquisition unit 56 is able to determine an area in which the storage apparatus 10a (the user U) is located, on the basis of the location information that is acquired by the GNSS receiving unit 28 and the map information 24C.

The location information acquisition unit 56 determines whether the storage apparatus 10a (the user U) has moved between the areas, for example. The location information acquisition unit 56 determines whether the storage apparatus 10a (the user U) has moved from the point P1 in the area A1 to the point P2 in the area A2, for example. The location information acquisition unit 56 determines whether the storage apparatus 10a (the user U) has moved from the point P2 in the area A2 to the point P3 in the area A3, for example. The location information acquisition unit 56 determines whether the storage apparatus 10a (the user U) has moved from the point P3 in the area A3 to the point P4 in the area A4, for example. The location information acquisition unit 56 determines whether the storage apparatus 10a (the user U) has moved from the point P4 in the area A4 to the point P5 in the area A5, for example. In the present embodiment, the location information acquisition unit 56 determines that the storage apparatus 10a (the user U) has moved the predetermined distance or more if, for example, the storage apparatus 10a (the user U) has moved to a different area.

If it is determined that the storage apparatus 10a (the user U) has moved the predetermined distance or more (Step S114; Yes), the process goes to Step S116. If it is determined that the storage apparatus 10a (the user U) has not moved the predetermined distance or more (Step S114; No), the process goes to Step S128.

If it is determined as Yes at Step S114, the control unit 26a resets the encryption chain (Step S116). Specifically, the encryption unit 48a resets a value of the initial vector for generating the encryption key, in accordance with a predetermined rule. In other words, in the present embodiment, for example, every time the storage apparatus 10a (the user U) moves to a different area, the initial vector is reset and an encrypted image is separately stored in the storage apparatus 10a for each area. Then, the process goes to Step S128.

Processes from Step S118 to Step S128 are the same as the processes from Step S32 to Step S42 illustrated in FIG. 4, and therefore, explanation thereof will be omitted.

As described above, in the third embodiment, the initial vector for generating an encryption key is reset if the storage apparatus 10a (the user U) has moved the predetermined distance or more. With this configuration, in the third embodiment, it is possible to increase security and more appropriately store the image.

Furthermore, in the third embodiment, an image is separately stored for each predetermined distance, for example, for each area. With this configuration, in the third embodiment, when reproducing an image of a specific area, it is not needed to decrypt all of images, so that it is possible to reproduce the image of the specific area.

Fourth Embodiment

Figure 11:
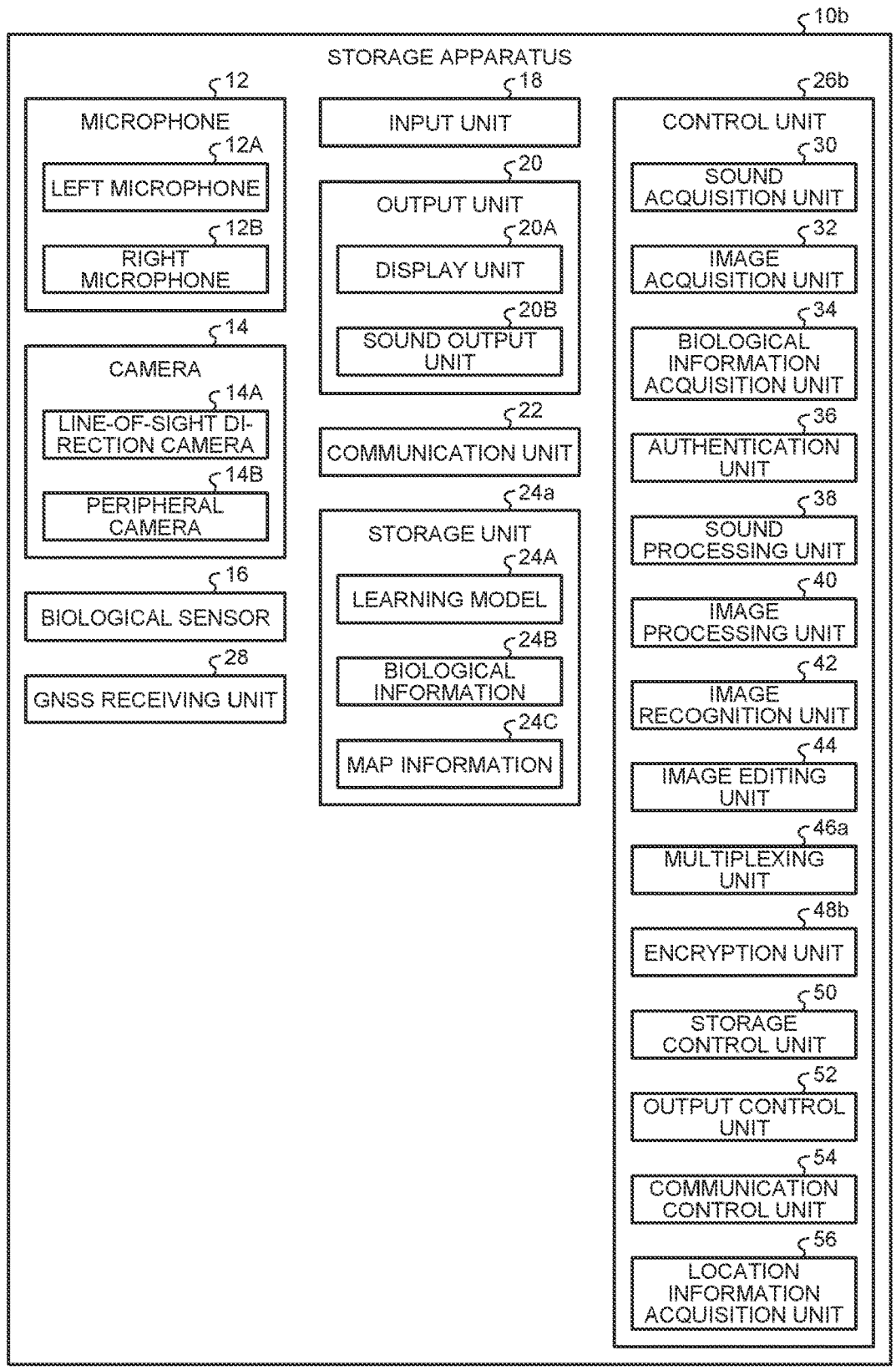
FIG. 11 is a diagram illustrating a configuration example of a storage apparatus according to a fourth embodiment.

A fourth embodiment will be described below. FIG. 11 is a block diagram illustrating a configuration example of a storage apparatus according to the fourth embodiment. A storage apparatus 10b according to the fourth embodiment is different from the storage apparatus 10a illustrated in FIG. 6 in that an encryption unit 48b of a control unit 26b has a different function.

In the fourth embodiment, when the location information acquisition unit 56 determines that the storage apparatus 10b (the user U) has moved a predetermined distance or more, the encryption unit 48b resets the initial vector and generates an initial vector and an encryption key based on location information on a moved location.

Process Performed by Storage Apparatus

A process performed by the storage apparatus according to the fourth embodiment will be described with reference to FIG. 12. FIG. 12 is a flowchart illustrating an example of the flow of a process performed by the storage apparatus according to the fourth embodiment.

Processes from Step S130 to Step S156 are the same as the processes from Step S90 to Step S116 illustrated in FIG. 9, and therefore, explanation thereof will be omitted.

The control unit 26b generates an encryption key on the basis of the current location information on the storage apparatus 10b (the user U) (Step S158). Specifically, in the present embodiment, the AES encryption method is used, a block cipher has a size of 128 bits, an encryption key has a size of 256 bits, and an initial vector has a value of 128 bits. It is preferable that the encryption unit 48b generates the initial vector with a random value to make decryption of the encryption difficult. In the present embodiment, the encryption unit 48b generates the value of the initial vector on the basis of the current location information. For example, the encryption unit 48b may generate the initial vector on the basis of the latitude and the longitude of the current location. The encryption unit 48b may generate the encryption key on the basis of the current location information on the storage apparatus 10b (the user U). The encryption unit 48b may generate the encryption key on the basis of the current location information on the storage apparatus 10b (the user U) and the biological information on the user U. It is preferable for the encryption unit 48b to generate the initial vector with a different value for each message to be encrypted. Then, the process goes to Step S170.

Processes from Step S160 to Step S170 are the same as the processes from Step S118 to Step S128 illustrated in FIG. 9, and therefore, explanation thereof will be omitted.

As described above, in the fourth embodiment, the initial vector and the encryption key are generated on the basis of the current location information on the storage apparatus 10b (the user U). With this configuration, in the fourth embodiment, it is possible to increase complexity of an algorithm for generating the initial vector and the encryption key, so that it is possible to further improve safety.

Furthermore, in the fourth embodiment, the image is separately stored for each predetermined distance, for example, for each area. Moreover, in the fourth embodiment, it is possible to encrypt the image of each specific area by using the initial vector that is generated in accordance with location information on the image and by using the encryption key, so that it is possible to generate a large number of combinations of the initial vectors and the encryption keys. With this configuration, in the fourth embodiment, it is possible to further improve the safety.

A program for performing the storage method described above may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to the present disclosure, it is possible to appropriately store a video in a line-of-sight direction of a user.

The storage apparatus of the present embodiment is applicable to a wearable device that is worn by a user.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage apparatus comprising:
   a biological sensor configured to detect biological information on a user;
   an image acquisition unit configured to acquire, from an image capturing unit, an image that is captured around the user;
   an image processing unit configured to separate the image around the user into a line-of-sight direction image related to an image in a line-of-sight direction of the user and a peripheral image related to an image other than the line-of-sight direction image;
   an encryption unit configured to generate an encryption key for encrypting the line-of-sight direction image based on the biological information on the user, and to encrypt the line-of-sight direction image by using the encryption key;
   a storage control unit configured to store the line-of-sight direction image that is encrypted by the encryption unit in a storage unit; and
   a location information acquisition unit configured to acquire location information on the user, wherein
   when the location information on the user indicates movement of a predetermined distance or more, the encryption unit is configured to reset an encryption chain related to the encryption key and generate an encryption key for encryption based on the location information on the user.

2. The storage apparatus according to claim 1, further comprising:
   an image determination unit configured to determine whether the peripheral image includes privacy information; and
   an image editing unit configured to edit the privacy information such that the privacy information is indistinguishable when the peripheral image includes the privacy information.

3. The storage apparatus according to claim 1, wherein
   the image processing unit is configured to temporally synchronize the line-of-sight direction image and the peripheral image, and
   the storage control unit is configured to store the line-of-sight direction image in the storage unit and to store the peripheral image in an external apparatus via a communication unit.

4. The storage apparatus according to claim 1, wherein when it is determined that the user has moved between areas that are determined in advance based on the location information on the user and map information that is stored in the storage unit, the encryption unit is configured to reset an encryption chain related to the encryption key.

5. A storage method comprising:
acquiring location information on a user;
detecting biological information on the user;
acquiring, from an image capturing unit, an image that is captured around the user;
separating the image around the user into a line-of-sight direction image related to an image in a line-of-sight direction of the user and a peripheral image related to an image other than the line-of-sight direction image;
generating an encryption key for encrypting the line-of-sight direction image based on the biological information on the user;
encrypting the line-of-sight direction image by using the encryption key; and
storing the encrypted line-of-sight direction image in a storage unit, wherein
the generating of the encryption key includes, when the location information on the user indicates movement of a predetermined distance or more, resetting an encryption chain related to the encryption key and generating an encryption key for encryption based on the location information on the user.

6. A non-transitory computer-readable storage medium storing a program causing a computer to execute:
acquiring location information on a user;
detecting biological information on the user;
acquiring, from an image capturing unit, an image that is captured around the user;
separating the image around the user into a line-of-sight direction image related to an image in a line-of-sight direction of the user and a peripheral image related to an image other than the line-of-sight direction image;
generating an encryption key for encrypting the line-of-sight direction image based on the biological information on the user;
encrypting the line-of-sight direction image by using the encryption key; and
storing the encrypted line-of-sight direction image in a storage unit, wherein
the generating of the encryption key includes, when the location information on the user indicates movement of a predetermined distance or more, resetting an encryption chain related to the encryption key and generating an encryption key for encryption based on the location information on the user.

* * * * *